United States Patent [19]

Potter et al.

[11] Patent Number: 5,219,620
[45] Date of Patent: Jun. 15, 1993

[54] METHOD AND APPARATUS FOR FOAM TREATING PILE FABRICS

[75] Inventors: Jerry F. Potter, Seaford, Del.; W. Lamar Brown, Ringgold, Ga.

[73] Assignee: E. I. Du Pont de Nemours and Company, Wilmington, Del.

[21] Appl. No.: 735,579

[22] Filed: Jul. 25, 1991

[51] Int. Cl.$^5$ .............................................. B05D 1/26
[52] U.S. Cl. .............................. 427/434.2; 427/443.2; 118/410; 118/419; 118/209
[58] Field of Search ............... 427/244, 389.9, 388.4, 427/434.2, 443.2; 118/410, 419, 209; 428/95

[56] References Cited

U.S. PATENT DOCUMENTS

| | | | |
|---|---|---|---|
| 4,023,526 | 5/1977 | Ashmus et al. | 118/410 |
| 4,193,762 | 3/1980 | Namboodri et al. | 8/14 |
| 4,266,976 | 5/1981 | Gregorian et al. | 8/477 |
| 4,275,683 | 6/1981 | Kutz et al. | 118/407 |
| 4,402,200 | 9/1983 | Clifford et al. | 239/590 |
| 4,502,304 | 3/1985 | Hopkins | 68/200 |
| 4,534,189 | 8/1985 | Clifford | 118/410 |
| 4,537,801 | 8/1985 | Takeda | 118/410 |
| 4,576,112 | 3/1986 | Funger et al. | 118/415 |
| 4,581,254 | 4/1986 | Cunningham et al. | 118/410 |
| 4,776,997 | 10/1988 | Chino et al. | 118/410 |

FOREIGN PATENT DOCUMENTS

| | | |
|---|---|---|
| 0054307 | 12/1981 | European Pat. Off. |
| 0108920 | 10/1983 | European Pat. Off. |
| 2328960 | 2/1975 | Fed. Rep. of Germany |
| 3419367A1 | 11/1984 | Fed. Rep. of Germany |
| WO8401588 | 4/1984 | PCT Int'l Appl. |
| 1585874 | 5/1977 | United Kingdom |
| 2120959 | 4/1983 | United Kingdom |

OTHER PUBLICATIONS

W. Hartmann, Krefeld, "Fluidyer-A New Bath Application System" *ChemiefasernTextilind*, 36,602-4 (1986).
Frank O'Neil, ed., "The Environment and the Carpet Industry", *Carpet & Rug Industry*, Jan. '91; pp. 31-53.
Robert S. Blount, III, "The Kusters Foam Applicator For Dyeing and Finishing". *Water Conservation Technology in Textiles-State of the Art*, WRR1 Bulletin 46, May '82, pp. 40-45.
G. Robert Turner, "Finishing and Dyeing With Foam", *Textile Chemist and Colorist*, vol. 14, No. 2, Feb. 1982, pp. 23/15-27/19.

*Primary Examiner*—Shrive Beck
*Assistant Examiner*—Katherine A. Bareford

[57] ABSTRACT

The invention involves a process for foam treating pile fabrics, especially carpets, by applying a foam composition through the backing of the fabric. The fabric is wrapped partially around the foam applicator at a wrap angle of at least 60 degrees, while the facing of the fabric is free of pressure. A foam applicator is also taught.

6 Claims, 4 Drawing Sheets

METHOD AND APPARATUS FOR FOAM TREATING PILE FABRICS

BACKGROUND OF THE INVENTION

1. Field of the Invention

The present invention relates to a process for foam treating pile fabrics, especially carpets, and to a foam applicator device which may be used in such a process. More particularly, this invention involves foam treating a carpet by applying a foam composition through the backing of the carpet.

2. Description of Related Art

It is well known to apply "foam compositions" to the facing of pile fabrics, such as carpets. By the term "foam composition" or "foam", it is meant a stable foam composition which contains chemical treating agents, such as, e.g., dyes, antistatics, stain resist agents, and fluorochemicals, and mixtures thereof.

Generally, the use of a foaming medium is an effective means for applying treating agents, since it reduces water usage, energy required to heat the carpet for promoting setting of the agents, and effluent streams which require waste treatment or contribute to overall pollution from the process. Various types of equipment, such as the one described in U.S. Pat. No. 4,576,112 to Funger et al., apply foamed agents to the face of a carpet with a resilient seal pressed against the backing of the carpet to promote sealing. Such equipment is presently in commercial use to foam apply both fluorochemical and stain resist agents to the facing of carpets.

These techniques and equipment are considered improvements over such ones, as described in U.S. Pat. No. 4,193,762 to Namboodri et al., and U.S. Pat. No. 4,275,683 to Kutz et al., where foam is cast onto one or both sides of a carpet and calendered into the surface by rolls or other pressure application means.

However, conventional methods have several disadvantages. For instance, at wet pick-up levels (the ratio of the weight of the liquid applied to the dry weight of the carpet $\times 100$) less than 100%, the porosity of the carpet, when compressed by all known methods, is low and foam penetration into the carpet, especially heavy weight carpets, is only 50 to 70% from the point of application to the deepest point in the carpet face. As carpet density and pile volume increase, the ability of conventional methods to uniformly distribute the foam throughout the carpet is even further reduced.

Some proposed solutions to this problem of completely and uniformly distributing treating agents into the carpet do not even involve foam application.

For example, one method commonly used for applying the treating agents involves flooding the agents onto the surface of a carpet at wet pick-up levels greater than 350%. Currently, the most effective equipment used for applying stain resist agents is the Flexnip, produced by Edward Kusters Machinenfabrik, Gladbacher Strasse, Krefeld, Germany. Treating agents applied by this type of process are substantially 100% distributed throughout the carpet by raising wet pick-up levels to the point where excessive fluid exists. The excessive fluid distributes the chemicals as it flows across the face of the carpet during application, or as it traverses the fiber tufts. However, this process uses excessive amounts of energy and water and requires extracting excess stain resist agents before the carpet is dried. As a result, unacceptable levels of effluent which must be treated are formed.

In other cases, the carpet mills currently apply treating agents by spraying or foaming the agents onto the face of the carpet after the washing and extraction steps. These techniques, commonly used for applying fluorochemicals, result in uneven distribution of the chemicals through the carpet, with the majority of the chemicals being concentrated along the upper half of the tuft. For spray systems, treating agents are concentrated in the upper 20% of the tuft lengths. As a result, a considerable amount of the chemicals is lost in the shearing step during final finishing of cut pile carpets.

Clearly, there is a need to develop an improved means for adding dyes or post dye chemical treating agents to carpets. A desirable process would require less water and energy, reduce effluent streams, and improve the distribution and uniformity of chemical application. Foam application, at low wet pick-ups, offers the best approach to achieve these desired benefits, provided it is uniformly applied. The present invention provides such a process, wherein the foam is applied through the carpet backing at low wet pick-ups and uniformly and completely penetrates throughout the carpet. This invention also includes a new foam applicator apparatus.

SUMMARY OF THE INVENTION

The present invention relates to a process for foam treating pile fabrics, especially carpets. The process involves passing the fabric through an application zone which contains a pair of rollers and a foam applicator. The backing of the fabric is pressed against the applicator, while the facing is free of pressure. From the applicator, a foam composition is applied through the backing of the fabric, e.g., a woven backing of a carpet, whereby the composition penetrates throughout the fabric. The carpet is then further processed and finished by conventional techniques.

Preferably, the foam composition is applied at a wet pick-up in the range of about 10 to 30%. The foam composition's blow ratio is in the range of about 15:1 to 60:1, and its half-life is in the range of about five to twelve minutes.

This invention also includes a new foam applicator device. The foam applicator includes an applicator body containing a bore therethrough with injection slots extending from the sides of the applicator body to the bore, and an applicator slot extending from the bore to a slot bottom. There is also an internal distribution means contained within the bore, comprising: 1) an internal distribution pipe attached to the applicator body; 2) a pair of pistons slideably fitted into the bore and adapted to slide over the distribution pipe and toward the slot, said pistons being in communication with a source of pressurized fluid; and 3) a sealing means affixed to each piston and adapted to extend through the slot as the pistons moves toward the slot, thereby controlling the width of the slot. In one embodiment, the pistons are sealed to the inner walls of the applicator body by O-rings, and the internal distribution pipe is attached to the applicator body by pins.

DETAILED DESCRIPTION OF THE INVENTION

The present invention relates to a process and apparatus for foam treating pile fabrics, especially carpets. Generally, the process involves introducing a foam composition through the backing of the pile fabric, whereby the foam is distributed throughout the entire material.

More particularly, the process involves passing the pile fabric through an application zone. The application zone includes a pair of rollers and a foam applicator. A pair of additional driven pin rollers are positioned at the entrance and exit of the application zone and provide a means for controlling the tension of the fabric. Initially, the fabric passes over the pin rollers, and the pile of the fabric faces upwards, while the backing is in contact with the pin rollers which provide a positive grip. As the fabric passes in a substantially horizontal manner over the pair of rollers within the application zone, the direction of the fabric is reversed such that the backing is tightly pressed against the applicator slot. A small differential speed between the pin rollers is maintained to provide the tension needed to seal the backing against the applicator slot.

As the fabric passes through the application zone, the pair of rollers, each one located at a side and parallel to the applicator, provide a sufficient wrap angle to tightly seal the backing of the material against the applicator slot, while the face of the material is free of pressure. The foam is then applied, from the applicator, through the backing of the material.

The foam is preferably supplied to the applicator by a commercial dynamic foam generator system, because of the range of foam properties which it can produce. However, any foam generation system can be used, provided it is capable of producing consistent foam quality and high blow ratios.

Presently, commercial foam applicators, such as the FFT manufactured by Gaston County, of Oglethorpe, Ga., the KFA and Fluicon units manufactured by Edward Kusters Machinefabrik, of Gladbacher Strasse, Krefeld, Germany, and the Texicon foamer, manufactured by ICS Texicon Ltd., of Newbury Berkshire, England, do not provide acceptable foam penetration or uniformity, even when it is applied through the backing of a carpet.

However, in accordance with this invention, it is believed that such foam applicator units can be modified for applying foam through the backing of pile fabrics. The devices may be altered by removing or disengaging the counter pressure rolls, bladders, or plates such that substantially no opposing force is present to disturb or compress the pile at the point of foam injection. Introducing the fabric by bars, rolls, or other means, in order to tightly wrap it around the applicator and form a seal is effective in producing improved penetration, provided the face fiber tufts are free to move and unconstrained.

A preferred foam applicator will have a small face width, and allow opening and fanning of tufts as they pass the point of foam application. The freeing of the tufts provides an unrestricted path for foam flow, so that the foam is uniformly distributed along the tufts.

Moreover, since the face of the fabric is unconstrained, and there is no opposing sealing surface, the penetration of the foam is uninhibited. This arrangement is particularly effective for foam treating carpets, since it allows the individual tufts to move and open up to the atmosphere. As a result, the porosity of the carpet face increases, and the foam penetrates more uniformly and completely into the tufts of the carpet.

The sealing effect, caused by tensioning of the backing, provides the necessary pressure for the foam to uniformly penetrate through the backing and to the face of the fabric. The sealing also slightly opens the weave of the backing which reduces the resistance to foam flow. When nonwoven backings are used, the resistance is less and overall penetration should be better.

The foam treating methods of this invention may be used to treat carpets having a variety of primary backings such as, for example, spunbonded nonwoven or woven backings. In accordance with this invention, the transfer of foam through the carpet backing provides several advantages over applying the foam to the face of the carpet. For instance, when textured pile carpets are foam treated by face application, the foam flows to the low pile areas of the carpet, resulting in poor uniformity. This unequal distribution of foam occurs due to the pressure differences between the higher and lower pile areas, where the higher pile provides more resistance. This invention provides an improved distribution of the foam by transferring it through the backing, substantially equally along each tuft as well as along and across the carpet. The foam is distributed evenly without concern for variations in the carpet face profile. In effect, the backing acts as a metering device to even flow throughout the carpet.

The foam composition may include a variety of treating agents such as, for example, dyes, pigments, water repellents, antistatics, softeners, fire retardants, antioxidants, ultraviolet (UV) screeners, stain resist chemicals, and fluorochemicals, and mixtures thereof.

The foam compositions may be prepared by techniques known in the art. These compositions typically comprise a mixture of treating agents from about 1 to 50%, based on the total weight percent of the batch.

Foaming agents may be added in order to improve the composition's foaming potential. Suitable foaming agents are surface-active products belonging to many chemical classes, such as sulfonated long-chain alcohols, alcohol ethoxylates, alkyl aryl sulfonates, partially fluorinated alcohol ethoxylates, partially fluorinated alcohol phosphates, alcohol phosphates, aryl ether sulfonates, and mixtures thereof. Preferred foaming agents include "Mykon NR W-3", available from Sequa Chemical Corp. of Chester, S.C., and "Zonyl" fluorosurfactants, available from E.I. du Pont de Nemours and Company.

If necessary, a minimum concentration of foaming agents corresponding to the "critical micelle concentration" should be added. Since these foaming agents remain in the finished carpet, and in most cases reduce soil protection, the amount of foaming agents added by weight is in the range of about 0.1 to 1% and is preferably about 0.5% based on the total weight percent of the batch. This amount of foaming agents provides the optimum balance of soil performance and foam properties.

It is important that the foamable mixture be carefully prepared in order to provide a stable foam which retains it properties after being introduced into the carpet.

One significant condition is the level of "wet pick-up". By the term, "wet pick-up", it is meant the ratio of the weight of liquid applied to the dry weight of the carpet ($\times 100$). It is understood that the level of wet pick-up will vary depending upon several factors, including fiber structure, polymer type, carpet temperature, carpet weight, pile height, pile density, and type of primary carpet backing. Generally, high weight carpets comprising of yarns produced by an autoclave or Superba process (wet-set) require the highest wet pick-up and level of chemical addition. In the present invention, the preferred range of wet pick-up is between about 10 to 30%.

Another important factor is the "blow ratio". By the term, "blow ratio", it is meant the ratio of the volume of air to the volume of liquid mixed in the foam generator. The blow ratio depends upon such factors as the nature of the foam generator and chemistry of the foamable mixture. Generally, concentrated mixtures are more difficult to foam. In the present invention, the blow ratio is preferably in the range of about 15:1 to 60:1 and more preferably between about 50:1 to 60:1.

The half-life of the foam, i.e., the time required for the foam to collapse to half of its initial weight is also important, in order to insure shear stability and provide sufficient volume for transfer through the carpet. The half-life of the foam also allows a continuous process to experience normal stops and starts without the loss of application uniformity or having to restart the process. In the present invention, the foam composition should have a half-life between about five (5) to twelve (12) minutes, and preferably between about eight (8) to twelve (12) minutes.

The viscosity of the foam is also significant. The foam viscosity may be measured by a conventional rotating cylinder instruments, such as a Brookfield Viscometer. In the present invention, the range of the foam viscosity is about 5 to 50,000 centipoise. It is understood that the viscosity of the foam will vary with the foam concentration and blow ratio. However, the viscosity of the foam should be sufficient to allow the foam to be processed.

It is preferable to use a stable foam in order to avoid the chance of foam being trapped in the applicator, partly draining back to a liquid, and then being released back to the carpet. This results in uneven application and in inferior carpet performance or aesthetics. Retention of foam quality also improves the uniformity and distribution of the treating agents versus other topical finish application techniques currently in use. Proper design of the foam generation and distribution systems is also critical to prevent stagnation areas, where foam can collapse. For this reason, transition between the hardware components must be smooth and area changes should be gradual to retain high quality foam.

Figure 5:
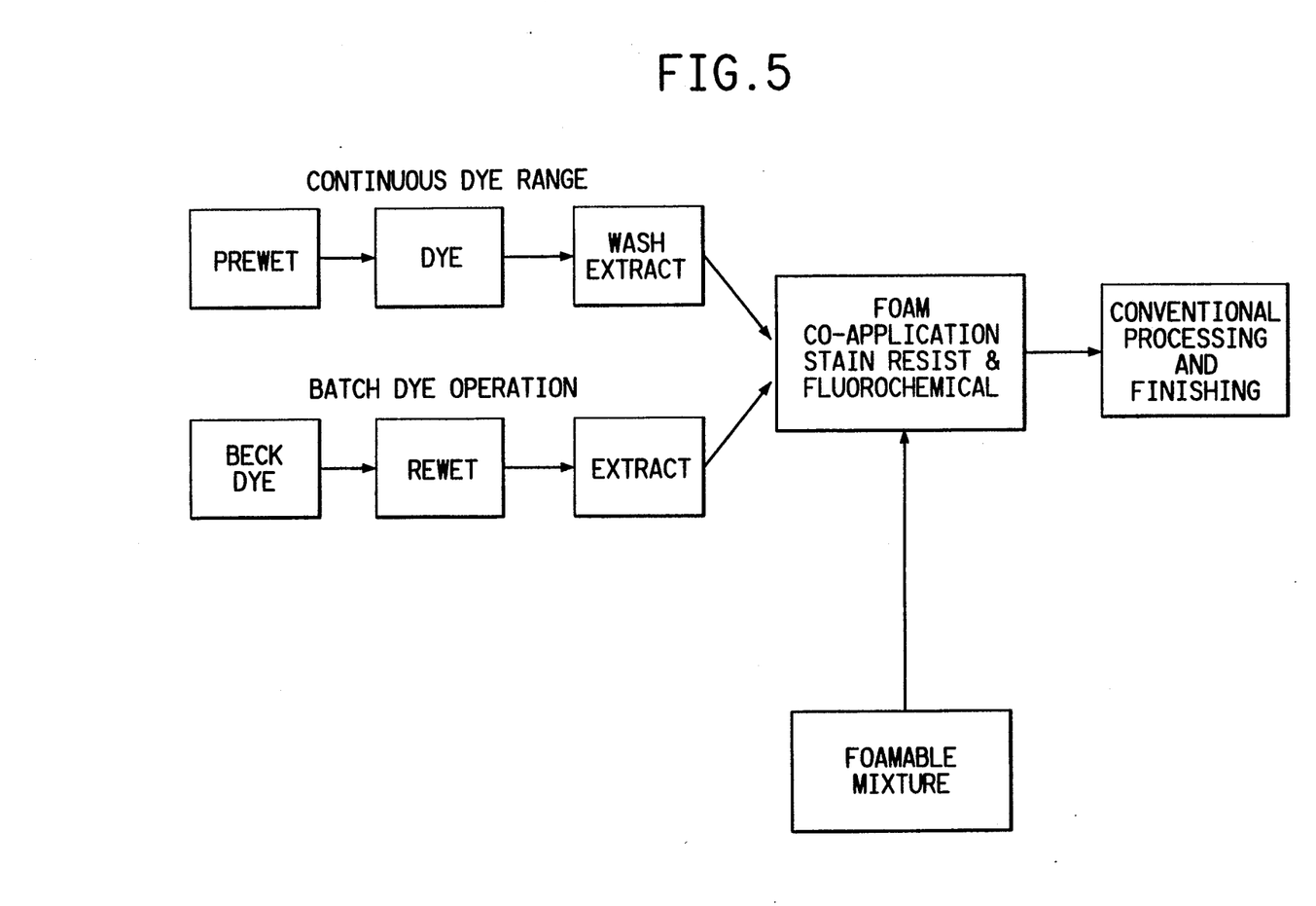
FIG. 5 is a process flow chart of the present invention.

The proposed foam treating process is suitable for integration with continuous dyeing and finish operations or batch operations, as illustrated in FIG. 5. The individual treating agents may be combined into a batch and then transferred to the foam generator, or they may be metered into a static mixer and then transferred to the foam generator. This foam solution is then transferred by pressure to the foam applicator. The foam applicator is located after the final wash extract step, after the dye setting step, or after the wet-out box on the wet goods dryer for batch operations.

The following description illustrates one embodiment of the present invention, but should not be construed as limiting the scope of the invention.

Figure 1:
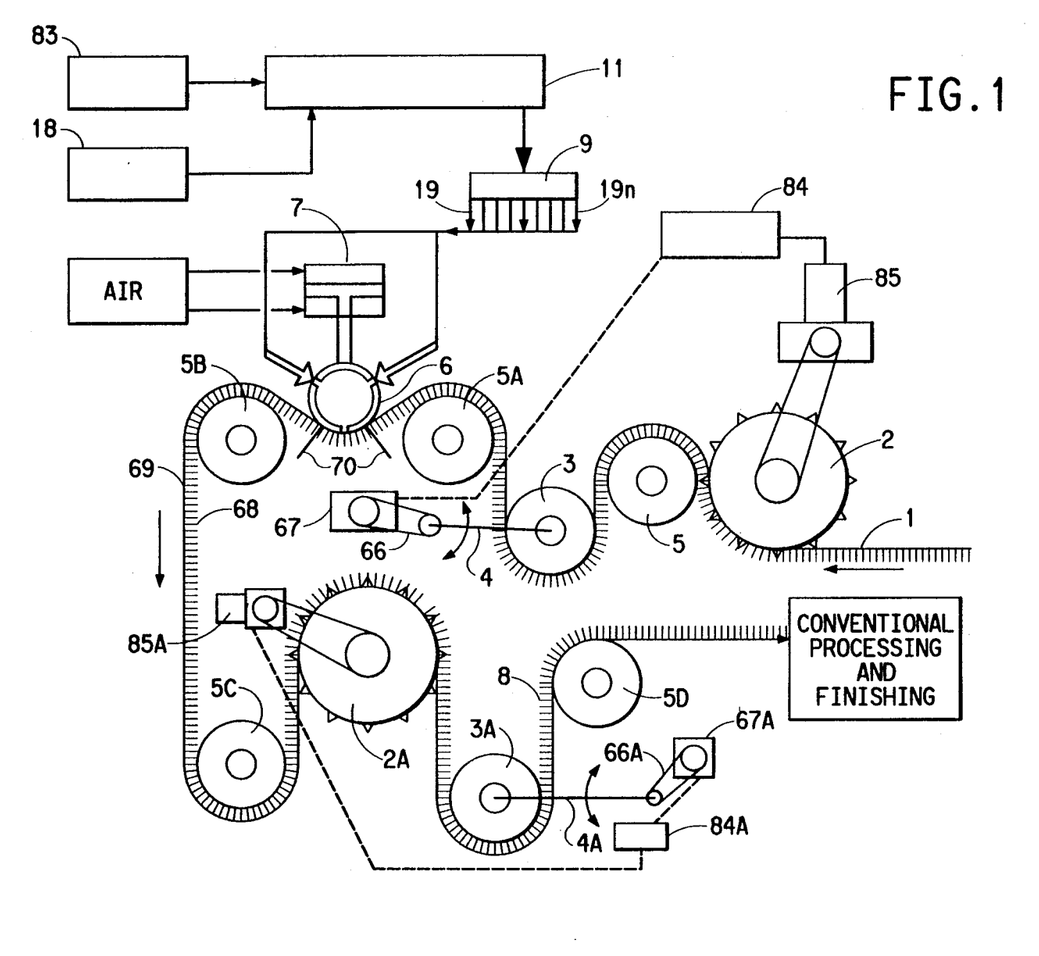
FIG. 1 is a side elevation view of the basic components of the process of the present invention.

Referring to FIG. 1, the foamable mixture (83) is delivered to a commercial dynamic foam generator device (11), such as a Model T-1000 manufactured by Latex Equipment Sales and Service of Dalton, Ga., where the composition is foamed. Compressed air is also delivered from a remote compressor (18) to the foam generator (11), where it is mixed in exact proportions. A distributive control system controls the foam generator (11) in order to produce foam of a desired blow ratio. The level of mixing and foam quality (bubble size, and half life) is adjusted by adjusting the speed of the mixing head of the foam generator (11), raising the system air pressure, and/or altering the level of foaming agent.

Figure 4:
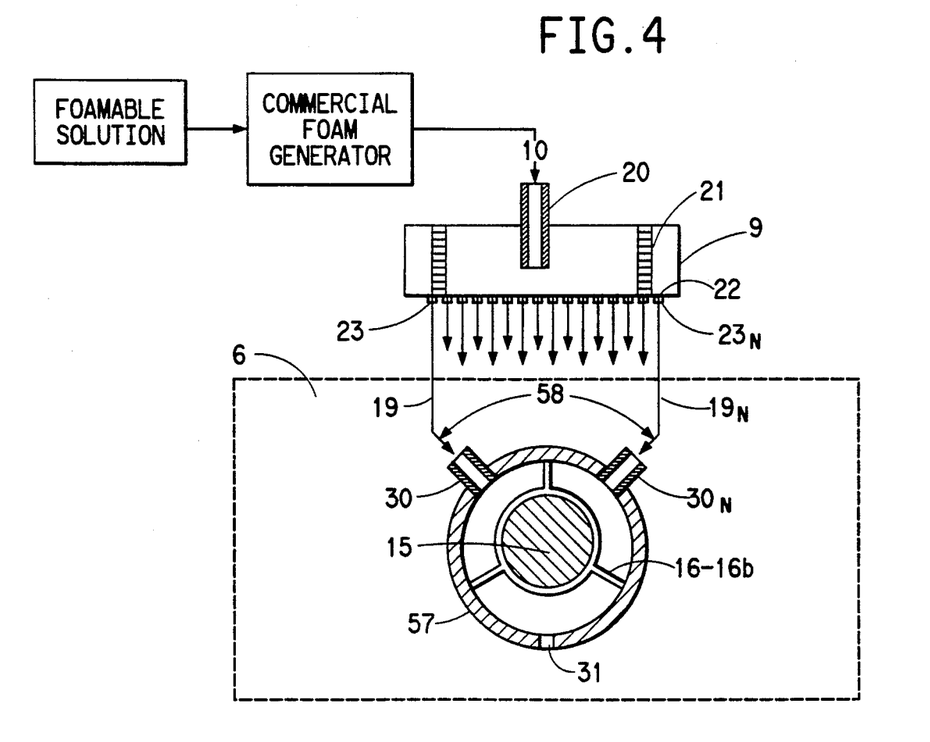
FIG. 4 is an elevation view of the foam distribution system including a cross-sectional view of the foam applicator.

The foam is then transferred to the foam distributor manifold (9), where referring to FIG. 4, a central feed tube (20) discharges the foam near the base of the distributor. Foam exits the inlet pipe radially from the central injection point (10) and passes through a 60% open area perforated ring (21) located near the peripheral part of the distributor manifold (9), and about 1 inch from the center of the discharge ports (23-23n). This perforated ring acts as a metering device to insure equal flow in all radial directions. The ring also provides some back pressure which is essential to obtain and support high blow ratios during transport of the foam to the applicator. The discharge ports (23-23n) are provided along a hole circle (22) near the edge of the distributor (9).

Figure 2:
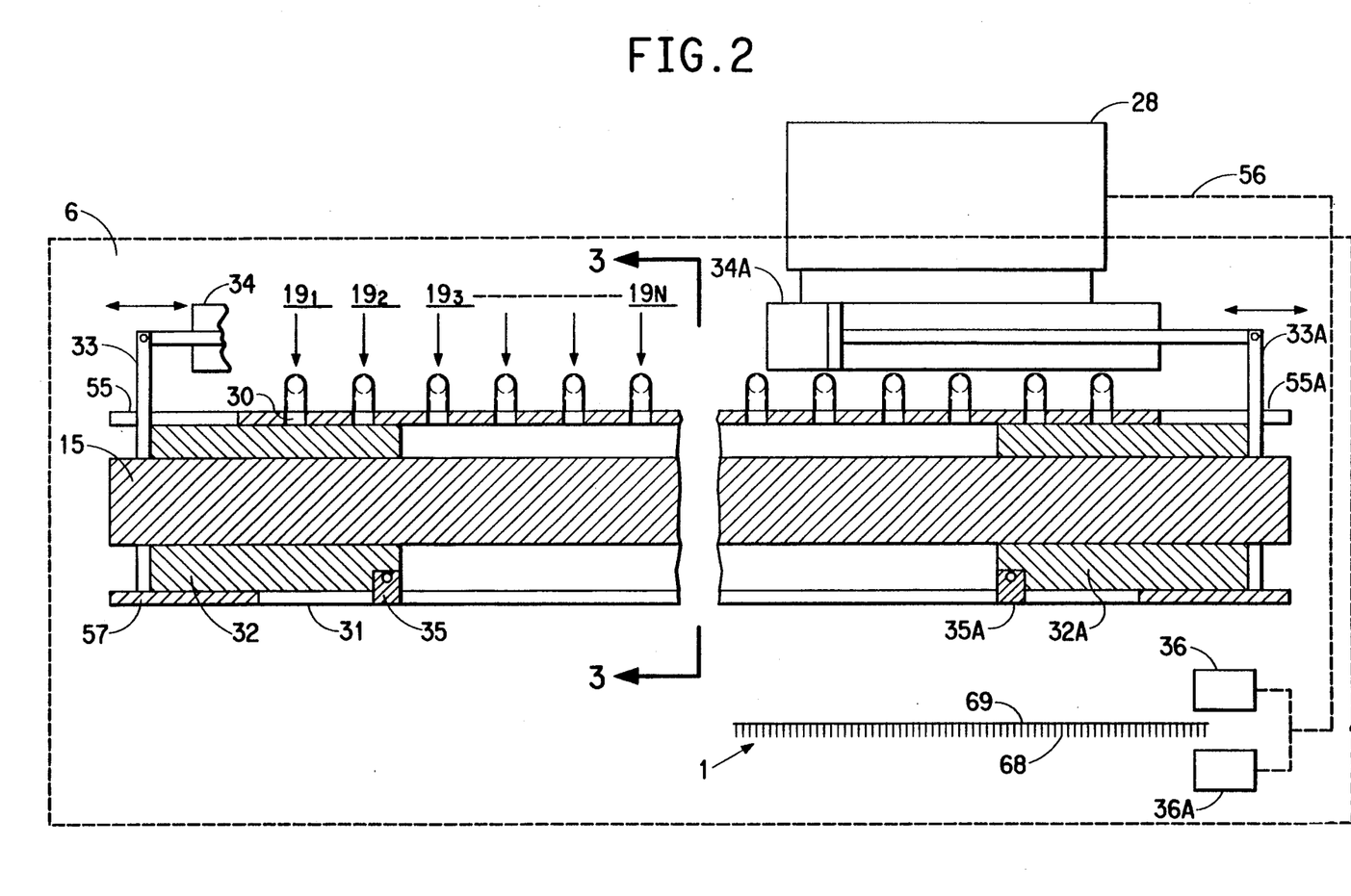
FIG. 2 is a sectional side elevation view of the foam applicator apparatus of the present invention.
Figure 3:
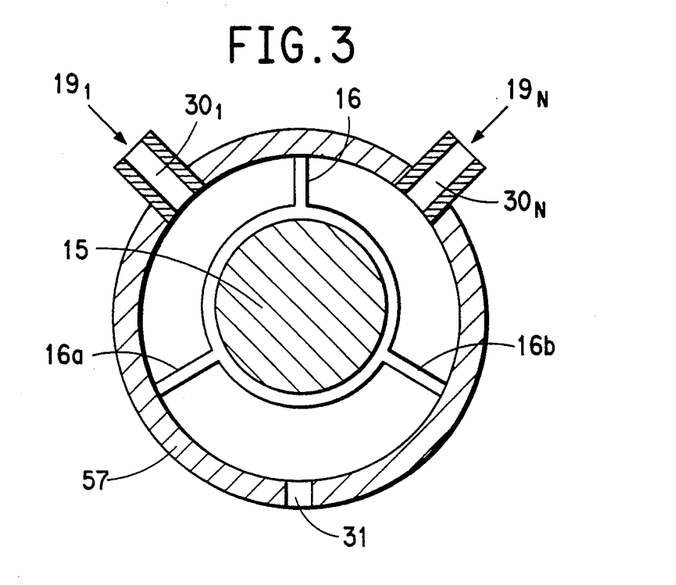
FIG. 3 is view 3—3, from FIG. 2, showing a cross-sectional view of the foam applicator.

Individual distribution tubes (19-19n), all of equal length and diameter, are connected to discharge ports (23-23n). The actual number of ports (23-23n) are determined by the width of the foam applicator (6), with an average number of 8 to 10 ports per foot of outer manifold pipe (57), as shown in FIG. 2. The hole circle (22) diameter, which passes through the centerline of the discharge ports (23-23n), is positioned to minimize the dead space between the ports. This arrangement prevents stagnation areas from forming between the discharge ports (23-23n). Nominal spacings between the discharge ports, along the 30 inch hole circle (22), are about 0.5 inches for 0.25 inch port diameters, with the outer wall of the distributor manifold (9) in line with the outer edge of the discharge port fittings (not shown).

The series of flexible distribution tubes (19-19n) transport foam from the distributor manifold (9) to the foam applicator assembly (body) (6). Foam is injected into the foam applicator body through injection ports (30-30n) which are spaced approximately 1-1.5 inches apart and staggered side to side at an angle (58) of approximately 30-45 degrees per side. Injection port to port spacing per side is 2 to 3 inches. The applicator body contains an internal distribution pipe (15) supported by pins (16-16b), and spaced on a 2 foot center to the inner walls of the applicator body. This distribution pipe (15) prevents foam jetting and promotes more uniform application by reducing the velocity head of the foam as it enters the applicator (6).

Foam then exits the applicator assembly (6) through applicator slot (31) in pipe (57). Referring to FIG. 2, the width of the applicator slot (31) is controlled by moving pistons (32) and (32A) which contain small seal plates (35) and (35A) that extend through the slot.

Referring to FIG. 1, during the normal steps of processing, dampened carpets having a wet pick-up in the range of about 40 to 60% are delivered from the upstream continuous dye or batch Beck dye process to the foam applicator (6). In the case of continuous dye ranges, carpets are washed and vacuum extracted to achieve a uniform wet pick-up before foam application. For a batch Beck process, the carpets are rewet and vacuum extracted before foaming to insure uniform processing and wet pick-up.

The carpet (1) is fed from the vacuum extractors (not shown) to the foam applicator assembly (6) by pin roll (2). A change of direction roll (5) is provided after the pin roll to control wrap angle on the pin roll (2) and to increase the contact area on the roll for even tensioning. Speed of the pin roll (2) is regulated by a compensator roll (3) attached by compensator arm (4) to a speed control potentiometer (67) through chain (66). As the compensator roll (3) moves, the speed of the pin roll drive motor (85) is adjusted by the drive controller (84) to provide a constant infeed speed to the foam applicator (6).

The carpet (1) is oriented so that it passes across the foam applicator (6) face down, with the primary carpet backing facing up toward and contacting the foam applicator. The carpet passes between a pair of vertically adjustable rollers (5A and 5B) used to control wrap angle (70) at the foam applicator. This insures that foam is forced through the primary carpet backing (69) as the foam exits the foam applicator slot, and enters the carpet pile on the face of the carpet (68). The foam applicator is pressed tightly against the carpet (1) by a load applied through pneumatic or hydraulic loaded cylinders (7) located across the face of the applicator to insure uniform pressure. The foam applicator (6) is allowed to float in order to insure that tension remains the same for all processes. As the head of the foam applicator floats, the wrap angle (70) is adjusted to maintain the tension constant. Wrap angle (70) is maintained at a nominal setting of 60 degrees (30 degrees per side) to insure that an adequate seal is maintained and that inlet tension is maintained at a load of approximately 50 pounds per foot of carpet width. It is also understood that the wrap angle (70) may vary from 30° to 180°.

The diameter of the foam applicator pipe (57) is kept small (1-3 inches) in order to promote opening of the carpet tufts as they pass the point of application. The foam which was uniformly distributed along the tufts by the applicator (6), when the foam further worked into individual tufts as the carpet passes over rollers (5B), (5C) and (3A) before further processing and finishing. The use of a pointed nose foam applicator, with a very sharp angle is feasible, and may be advantageous for very dense piles, where it is difficult to open the tufts. However, if such a pointed nose foam applicator is used, tension levels should be low and care must be taken to avoid damaging or distorting individual tufts in carpets as they pass the applicator slot. Control of foam properties such as blow ratio, surfactant levels, and foam half-life are essential for obtaining adequate penetration. Normally blow ratios of 50:1 to 60:1 are desired in order to keep wet pick-up as low as possible and to provide sufficient volume for transfer of the foamable compositions and promote penetration into tuft bundles.

A second driven pin roll (2A) is provided to insure precise tension and speed control throughout the application process. An additional roll (5C) is provided in order to orient the carpet such that the backing will contact the pin roll (2A) surface and a compensator roll (3A) is connected to the speed control pot (67A) through chain (66A). Chain (66A) is attached to arm (4A), where speed control pot (67A) is used to adjust the voltage of the pin roll drive motor (85A) which is controlled by a speed controller (84A). A slight speed difference is used to control tension between the two pin rolls (2) and (2A). After the foam composition is uniformly applied and distributed across and into the tufts, the treated carpet (8) is at a nominal 50-80% wet pick-up as it passes to conventional process and finishing steps.

Because of the movement of the carpet due to tracking and guiding errors, as the product moves through the processing line, it is necessary to provide a means for either adjusting the width of the foam applicator slot or repositioning it to correspond with the moving carpet. A side sealing system is located on each side of the foam applicator to correct for local migrations of the carpet during processing.

Referring to FIG. 2, the sealing system is comprised of a pair of pistons (32) and (32A) which are sealed to the inner walls of the applicator by close tolerances. Small seal plates (35) and (35A) are attached to the pistons (32) and (32A), and extend through the slot (31) on both ends to seal this portion of the foam applicator. This insures that the foam application area conforms to the carpet width. Positioning arms (33) and (33A) are attached to the pistons, and these arms extend through slots (55) and (55A) in the applicator body and are connected to positioning cylinders (34) and (34A). The slots (55) and (55A) have a sufficient length to allow for normal motion of the carpet of about 8 inches and to allow for the applicator slot (31) to span the normal range of carpet widths, from 9'-0" to 15'-0", and 36-107 inch widths for flat webs, such as fabrics, sheeting, and upholstery.

A pair of photo electric edge detectors (36) and (36A), manufactured by Idex Corporation, of Northbrook, Ill., are provided to sense the edge of the carpet backing or location of tuft area, depending on their adjustment. As carpet motion is detected by sensors (36) and (36A), a signal is sent from the Idex sensor to the Idex controller (28) by signal wire (56) which in turn operates valves and an air/oil system to position the end seal pistons (32) and (32A).

TEST METHODS

Carpet Stain Test

The stain rating of the carpets (top/bottom of the tufts) is measured according to the method outlined in Vinod, U.S. Pat. No. 4,925,707, the disclosure of which is hereby incorporated by reference.

Stain Protection Test

The depth of stain protection is assessed by cutting a random sample of full length tufts at their base from across the width of the carpet with a razor blade or removing the tuft from the backing by hand. The tufts are then stained, per the test described in Vinod, U.S. Pat. No. 4,925,707. The depth of stain protection is then determined by measuring the distance from the point, where the stain resist agents are applied to the point, where visible stain is observed.

EXAMPLES

In the following examples a solution having a total solid concentration of 2% by weight Du Pont SR-100, which is a mixture of styrene maleic acid copolymer and sulfonated phenolic condensate and 500 PPM Du Pont "ZONYL" 500 which is an aqueous fluorochemical dispersion of a perfluoroalkyl substituted urethane was foam applied to white mock dyed nylon 66 carpets of several weights and densities at different blow ratios and wet pick-up levels. The foam was applied using conventional foam technology (a KFA unit, manufactured by Edward Kusters Maschinenfabrik, Gladbacher Strasse, Krefeld, Federal Republic of Germany) and the process and apparatus of the present invention.

The KFA unit was used for applying foam to the face of the carpet and in one instance, to the backing of the carpet. In accordance with this invention, the proposed foam applicator, described in FIGS. 1-4, was used to apply foam to the backing of the tufted carpets. These broadloom tufted carpets were made by conventional techniques. The following test items represent the range of carpet weights, styles, pile heights, and densities normally processed. Foam process settings were selected to assess uniformity and performance for stain protection in the range of wet pick-ups and blow ratios which are of interest in this area of technology. The results are shown in Table 1, and the following comparisons are illustrative of the advantages of this invention but should not be considered as limiting.

A comparison of Comparative Item B versus Item C shows that foam applied to the backing of a carpet by a KFA unit resulted in very poor chemical penetration and distribution relative to foam applied by the process of this invention.

A comparison of Comparative Item F versus Items G and H shows that stain resist agents foam applied to the facing of a heavy weight carpet, at a 20% wet pick-up, by a KFA unit were only able to penetrate about 72% of the tuft length, while stain resist agents applied by the process of this invention were able to penetrate substantially 100% of the tuft length.

TABLE 1

| Item | Comparative A | Comparative B | C | Comparative D | Comparative E | Comparative F | G | H |
| --- | --- | --- | --- | --- | --- | --- | --- | --- |
| Application Technology | KFA | KFA | Back Side | KFA | KFA | KFA | Back Side | Back Side |
| Carpet Style | Texture cut | Texture cut | Texture cut | Texture cut | Cut Pile | Cut Pile | Cut Pile | Cut Pile |
| Carpet Weight oz./sq. yd. | 28 | 28 | 28 | 28 | 65 | 65 | 65 | 58 |
| Yarn Twist Set Method | Superba | Superba | Superba | Superba | Superba | Superba | Superba | Superba |
| Carpet Pile Height - Inches | 0.594 | 0.594 | 0.594 | 0.594 | 0.875 | 0.875 | 0.875 | 0.75 |
| Pile Density -oz./cu. yd. | 1689 | 1689 | 1689 | 1689 | 2647 | 2647 | 2647 | 2784 |
| Type Carpet Backing | Woven | Woven | Woven | Woven | Woven | Woven | Woven | Woven |
| Line Speed Dye Range - ft/min. | 50 | 50 | 50 | 50 | 18 | 18 | 18 | 18 |
| Foam - % Wet Pickup | 10 | 20 | 20 | 10 | 10 | 20 | 20 | 20 |
| Level Stain Resist Applied % owf | 4 | 4 | 4 | 4 | 4 | 4 | 4 | 4 |
| Theo. Level of Fluorochemical Applied PPM avg. | 500 | 500 | 500 | 500 | 500 | 500 | 500 | 500 |
| Solution PH | 3.5 | 3.5 | 3.5 | 3.5 | 3.5 | 3.5 | 3.5 | 3.5 |
| Foam Blow Ratio - Measured | 40 | 50 | 50 | 50 | 40 | 50 | 50 | 50 |
| Side of Carpet Foam Applied From | Face | Back | Back | Face | Face | Face | Back | Back |
| Backing Pressure Surface Used - KFA Only | Yes | Yes | No | Yes | Yes | Yes | No | No |
| Sealing Pressure Applied to Backing Surface psig | 6 | 6 | 0 | 6 | 6 | 6 | na. | na. |
| Speed of Dynamic Foam Generator Mixer RPM | 500 | 500 | 500 | 500 | 500 | 500 | 500 | 500 |
| Application Head Pressure Inches Water | 35 | 42 | 60 | 60 | 55 | 60 | 61 | 62 |
| Percent Tuft Length Coated With Strain Resist (2) | 80 | 29 | 100 | 85 | 63 | 72 | 98 | 100 |
| Stain Rating Top/Bottom (1) | 4/3 | 1/5 | 5/5 | 5/3 | 3/2 | 5/3 | 4/5 | 5/5 |
| Carpet Stain Test (1) | | | | | | | | |
| Stain Protection Test (2) | | | | | | | | |

We claim:

1. A process for foam treating a pile fabric, comprising the steps of:
   a) passing the fabric through an application zone, comprising a slotted foam applicator positioned between a pair of rollers, whereby the backing of the fabric is wrapped partially around the applicator at a wrap angle of at least 60 degrees to promote fanning of the pile, while the facing of the fabric is free of pressure; and b) applying a foam composition from the applicator, through the backing of the fabric, at a wet pick-up level in the range of about 10 to 30%, whereby the composition penetrates throughout the fabric.

2. The process of claim 1, wherein the pile fabric is a carpet.

3. The process of claim 2, wherein the carpet contains a woven backing.

4. The process of claim 2, wherein the foam composition comprises a mixture of stain resist agents and fluorochemical agents.

5. The process of claim 4, wherein the foam composition's blow ratio is in the range of about 15:1 to 60:1.

6. The process of claim 4, wherein the foam composition's half-life is the range of about five to twelve minutes.

* * * * *